(12) United States Patent
Saitoh et al.

(10) Patent No.: US 7,999,952 B2
(45) Date of Patent: Aug. 16, 2011

(54) PRINT PROCESSING SYSTEM, PRINTER AND RECORDING MEDIUM

(75) Inventors: Takashi Saitoh, Tokyo (JP); Satoshi Oyama, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 924 days.

(21) Appl. No.: 11/947,438

(22) Filed: Nov. 29, 2007

(65) Prior Publication Data
US 2008/0131181 A1 Jun. 5, 2008

Related U.S. Application Data

(60) Provisional application No. 60/868,204, filed on Dec. 1, 2006.

(51) Int. Cl.
*G06F 3/12* (2006.01)
*G06K 15/00* (2006.01)

(52) U.S. Cl. ............... 358/1.13; 358/1.15; 358/1.16

(58) Field of Classification Search ............... 358/1.13, 358/1.15, 1.14, 1.16, 1.6, 1.9; 399/82, 87, 399/88
See application file for complete search history.

(56) References Cited

U.S. PATENT DOCUMENTS
6,876,825 B2 * 4/2005 Kurahashi et al. ............... 399/82
7,532,349 B2 * 5/2009 Arakawa ..................... 358/1.16

FOREIGN PATENT DOCUMENTS
JP 2002-014797 1/2002
JP 2004-070661 3/2004

* cited by examiner

*Primary Examiner* — Jerome Grant, II
(74) *Attorney, Agent, or Firm* — Turocy & Watson, LLP (57) ABSTRACT

A recording medium having recorded therein a program for an information processing apparatus that exchanges information with a printing apparatus and causes the printing apparatus to execute printing, the program causes the information processing apparatus to execute a first print-setting generating and storing step of generating and storing at least one first print setting, a second print-setting acquiring step of acquiring at least one second print setting from the printing apparatus, a third print-setting selecting step of urging a user to select at least one third print setting out of the first print setting and the second print setting, a print-data converting step of converting a print command group issued by application software into respective print data in accordance with the respective third print settings, and a print-data transmitting step of transmitting the respective print data to the printing apparatus and causing the printing apparatus to print the print data.

18 Claims, 9 Drawing Sheets

Device setting   setting 2   in-house material (for executives)                32

Setting value
- Color or monochrome : [Monochrome] [Color]
- Duplex : [No] [Yes]   [Set]
- Staple : [No] [Yes]   [Set]
- Nin1 : [1] [2] [4] [8]
- Header setting : [In-house.hdr]   [Set]

[Start printing]   [Cancel]

FIG. 7

Device setting   uniform setting 2   document submitted to customer   33

Setting value
- Color or monochrome : [Monochrome] [Color]
- Duplex : [No] [Yes]   [Set]
- Staple : [No] [Yes]   [Set]
- Nin1 : [1] [2] [4] [8]
- Header setting : [Outside company.hdr]   [Set]

[Start printing]   [Cancel]

| Print screen    no setting | | | | □ × |
|---|---|---|---|---|
| | Setting value | | | |
| Color or monochrome : | Monochrome | Color | | |
| Duplex : | No | Yes | | Set |
| Staple : | No | Yes | | Set |
| Nin1 : | 1 | 2 | 4 | 8 |
| Header setting : | header.hdr | | | Set |
| Number of copies : | 2 ~34a | | | |
| Start printing | | Cancel | | |

PRINT PROCESSING SYSTEM, PRINTER AND RECORDING MEDIUM

CROSS-REFERENCE TO RELATED APPLICATIONS

This application claims the benefit of U.S. Provisional Application No. 60/868,204, filed Dec. 1, 2006.

BACKGROUND OF THE INVENTION

1. Field of the Invention

The present invention relates to a print processing system, a printer, and a recording medium that can use plural print settings in one operation.

2. Description of the Related Art

A printer driver, which is a program for causing a printing apparatus to operate, is provided in a computer. This printer driver has a function capable of not only converting data created by application software into a format for printing but also designating a printing method in the printing apparatus.

When a document created by the application software of the computer is printed in various different forms, it is necessary to change a print setting in the application software or the printer driver every time the printing is performed. In order to solve such complicated operation, techniques capable of using plural print setting are disclosed.

In a technique disclosed in JP-A-2002-14797, a presentation mode is prepared in print settings. When this mode is selected, it is possible to operate, at a time, printing for presentation of plural copies and printing with a layout changed for distribution of the plural copies.

Since the object of this technique is application to presentation, the technique is applicable to only a combination of a layout set during printing and a standard layout for presentation.

In a technique disclosed in JP-A-2004-70661, it is possible to check previews of plural print settings at a time. When plural previewed images are selected, results of the selection of the images are simultaneously printed.

In this technique, although it is possible to simultaneously perform printing according to the plural print settings, only one copy can be printed in each of the print settings.

BRIEF SUMMARY OF THE INVENTION

A recording medium according to a first aspect of the invention is a recording medium having recorded therein a print processing program for an information processing apparatus that exchanges information with a printing apparatus through a communication line and causes the printing apparatus to execute printing, the print processing program causing the information processing apparatus to execute: a first print-setting generating and storing step of generating and storing at least one first print setting via an input device connected to the information processing apparatus; a second print-setting acquiring step of acquiring at least one second print setting from the printing apparatus through the communication line; a third print-setting selecting step of urging a user to select at least one third print setting out of the stored first print setting and the acquired second print setting; a print-data converting step of converting a print command group issued by application software into respective print data in accordance with the selected respective third print settings; and a print-data transmitting step of transmitting the respective print data to the printing apparatus and causing the printing apparatus to print the print data.

A printing apparatus according to a second aspect of the present invention is a printing apparatus that exchanges information with an information processing apparatus through a communication line and executes a print operation, the printing apparatus comprising: a print-setting generating and storing unit that generates and stores at least one print setting; a print-setting transmitting unit that transmits the stored print setting to the information processing apparatus through the communication line according to a request from the information processing apparatus; and a printing unit that executes printing on the basis of print data transmitted from the information processing apparatus through the communication line.

A print processing system according to a third aspect of the present invention is a print processing system comprising: a printing apparatus; and an information processing apparatus that exchanges information with the printing apparatus and causes the printing apparatus to execute printing, the printing apparatus and the information processing apparatus being connected to each other through a communication line, wherein the information processing apparatus includes: a first print-setting generating and storing unit that generates and stores at least one first print setting via an input device connected to the information processing apparatus; a second print-setting acquiring unit that acquires at least one second print setting from the printing apparatus through the communication line; a third print-setting selecting unit that urges a user to select at least one third print setting out of the stored first print setting and the acquired second print setting; a print-data converting unit that converts a print command group issued by application software into respective print data in accordance with the selected respective third print settings; and a print-data transmitting unit that transmits the respective print data to the printing apparatus and causes the printing apparatus to print the print data, and the printing apparatus includes: a print-setting generating and storing unit that generates and stores at least one print setting; a print-setting transmitting unit that transmits the stored print setting to the information processing apparatus through the communication line according to a request from the information processing apparatus; and a printing unit that executes printing on the basis of the print data transmitted from the information processing apparatus through the communication line.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
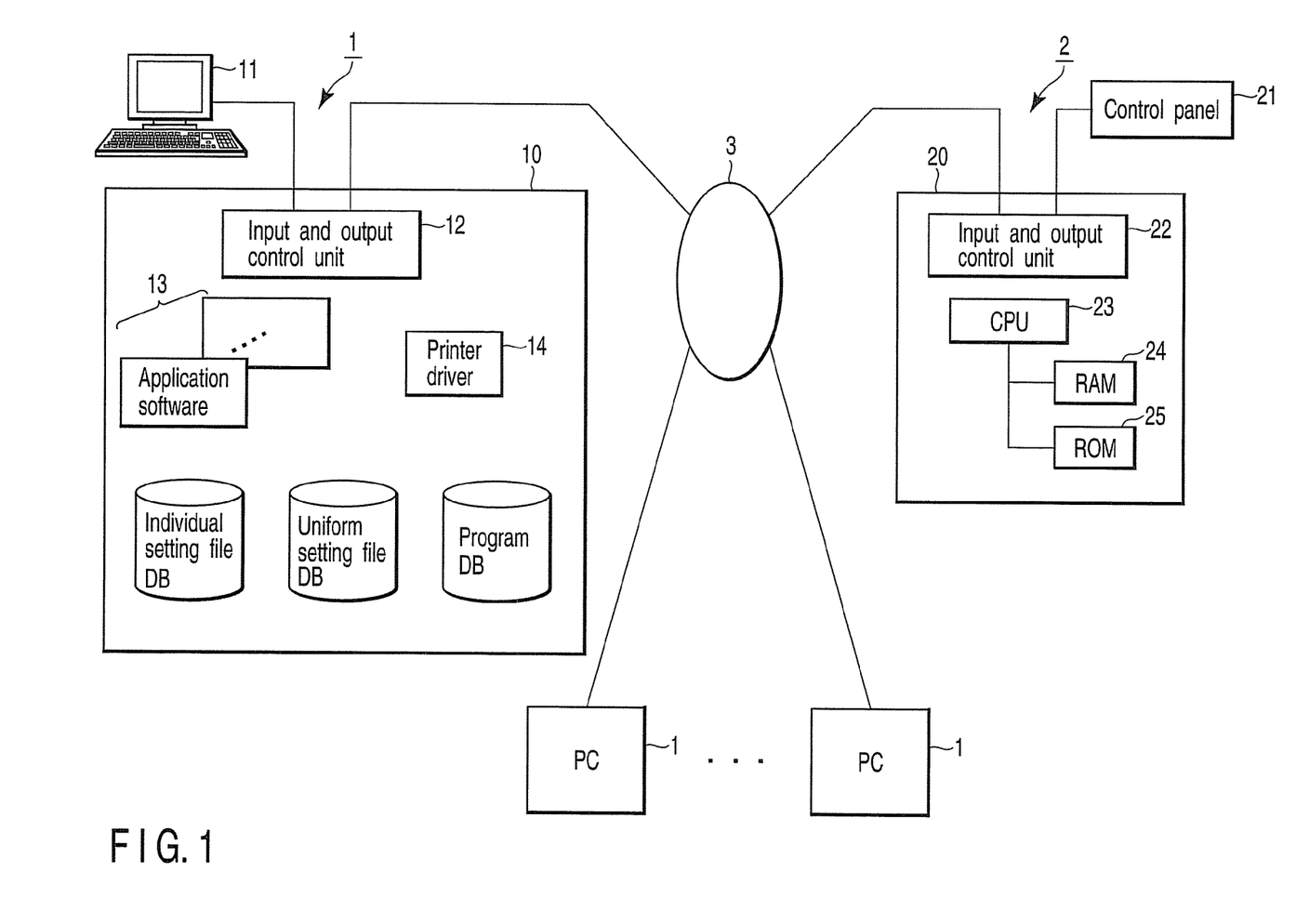
FIG. 1 is a diagram schematically showing a structure of a print processing system according to an embodiment of the invention.

FIG. 1 is a diagram schematically showing a structure of a print processing system according to an embodiment of the present invention. This print processing system includes personal computers (PCs) 1 and a multi function peripheral (MFP) 2 connected to each other through a communication line 3.

In a form of this print processing system shown in the figure, for example, plural PCs 1 provided in an office share one MFP 2. As the communication line 3, a network such as a LAN can be used.

Each of the PCs 1 includes a PC main body 10 and an input and output device 11. In the PC main body 10, an input and output control unit 12, application software 13, a printer driver 14, an individual setting file DB 15, a uniform setting file DB 16, and a program DB 17 are provided.

The input and output device 11 displays information transmitted from the PC main body 10 and inputs various instructions to the PC main body 10. The input and output control unit 12 is an interface for carrying out exchange of various kinds of information between the MFP 2 connected to the communication line 3 and the input and output device 11. The application software 13 and the printer driver 14 are programs that run under the management of an OS (not shown) of the PC 1 and realize a print processing method according to this embodiment.

In the individual setting file DB 15, print setting data created by the PC 1 is stored. In the uniform setting file DB 16, print setting data created by the MFP 2 is stored. In the program DB 17, various programs running on the PC 1 is stored.

The MFP 2 includes an MFP main body 20 and a control panel 21. In the MFP main body 20, an input and output control unit 22, a CPU 23, a RAM 24, and a ROM 25 are provided.

The control panel 21 displays information transmitted from the MFP main body 20 and inputs various instructions to the MFP main body 20. The input and output control unit 22 is an interface for carrying out exchange of various kinds of information between the PC 1 connected to the communication line 3 and the control panel 21. The CPU 23 collectively controls operations of the MFP 2. In the RAM 24, print setting data for the MFP 2 is stored. In the ROM 25, various programs running on the MFP 2 are stored.

A print setting method is explained.

Figure 2:
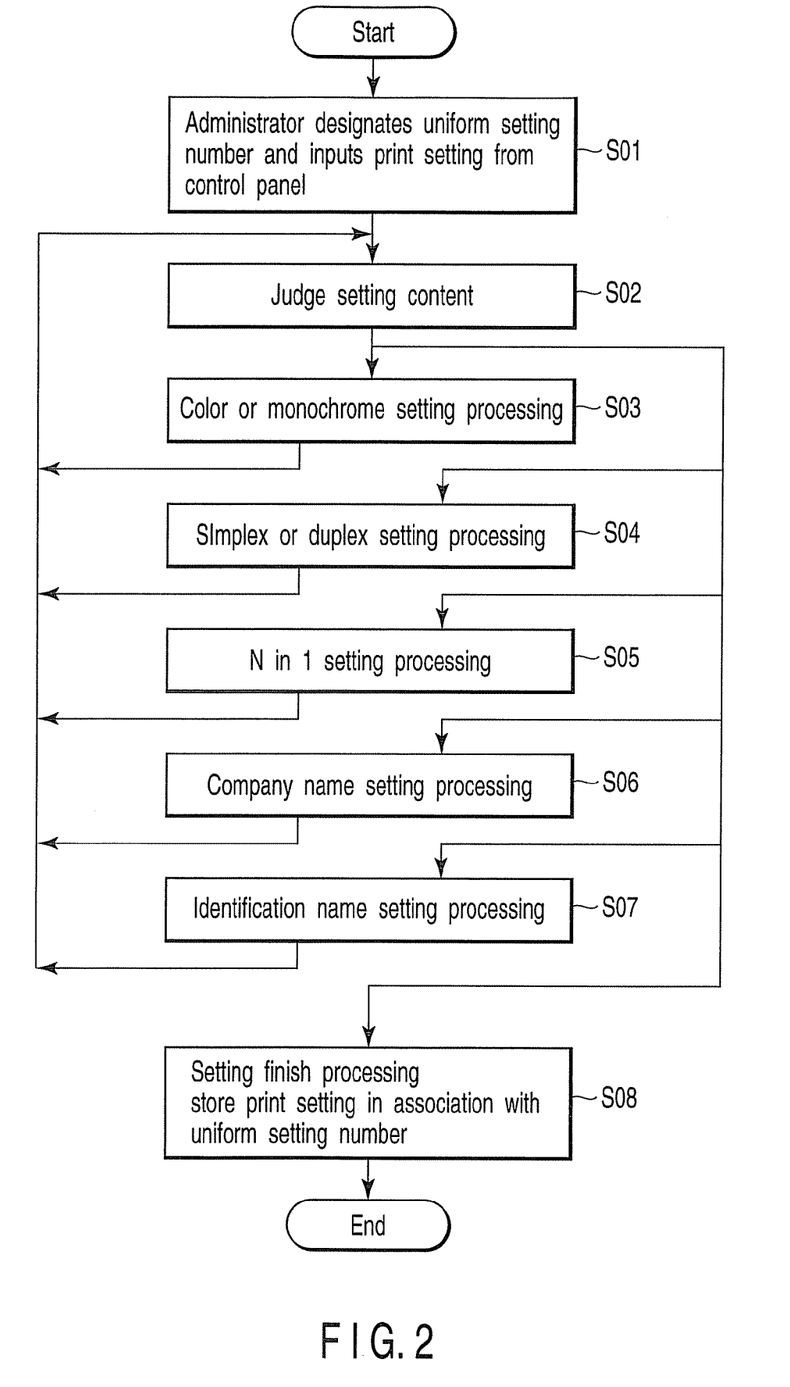
FIG. 2 is a flowchart showing a print setting procedure in which an administrator of a user inputs print setting data to an MFP.

FIG. 2 is a flowchart showing a print setting procedure in which an administrator of a user inputs print setting data to the MFP 2. Data set in this print setting is uniformly (commonly) used when the respective PCs 1 use the MFP 2. Therefore, this setting is referred to as uniform setting.

In step S01, the administrator designates a uniform setting number and inputs print setting data from the control panel 21. In step S02, the CPU 23 judges setting content.

When the setting content is designation of "color or monochrome", in step S03, the CPU 23 executes color or monochrome setting processing. An original is printed in color or monochrome in accordance with this setting. When the setting content is "simplex or duplex", in step S04, the CPU 23 executes simplex or duplex setting processing. Printing on one side of an original and printing on both sides of the original are controlled in accordance with this setting. When the setting content is designation of "N in 1", in step S05, the CPU 23 executes N in 1 setting processing. N pieces of data are printed for one original in accordance with this setting. When the setting content is designation of a "company name", in step S06, the CPU 23 executes company name setting processing. An inputted company name is printed in a predetermined position of an original in accordance with this setting. When the setting content is designation of an "identification name", in step S07, the CPU 23 executes identification name setting processing. An inputted identification name is associated with the uniform setting number in accordance with this setting.

When "setting end" is inputted, in step S08, the CPU 23 stores the uniform setting number and the print setting data in the PAM 24 in association with each other. Items as objects of the uniform setting are not limited to the examples described above. For example, various functions of the MFP 2 can be adopted as setting object items.

Figure 3:
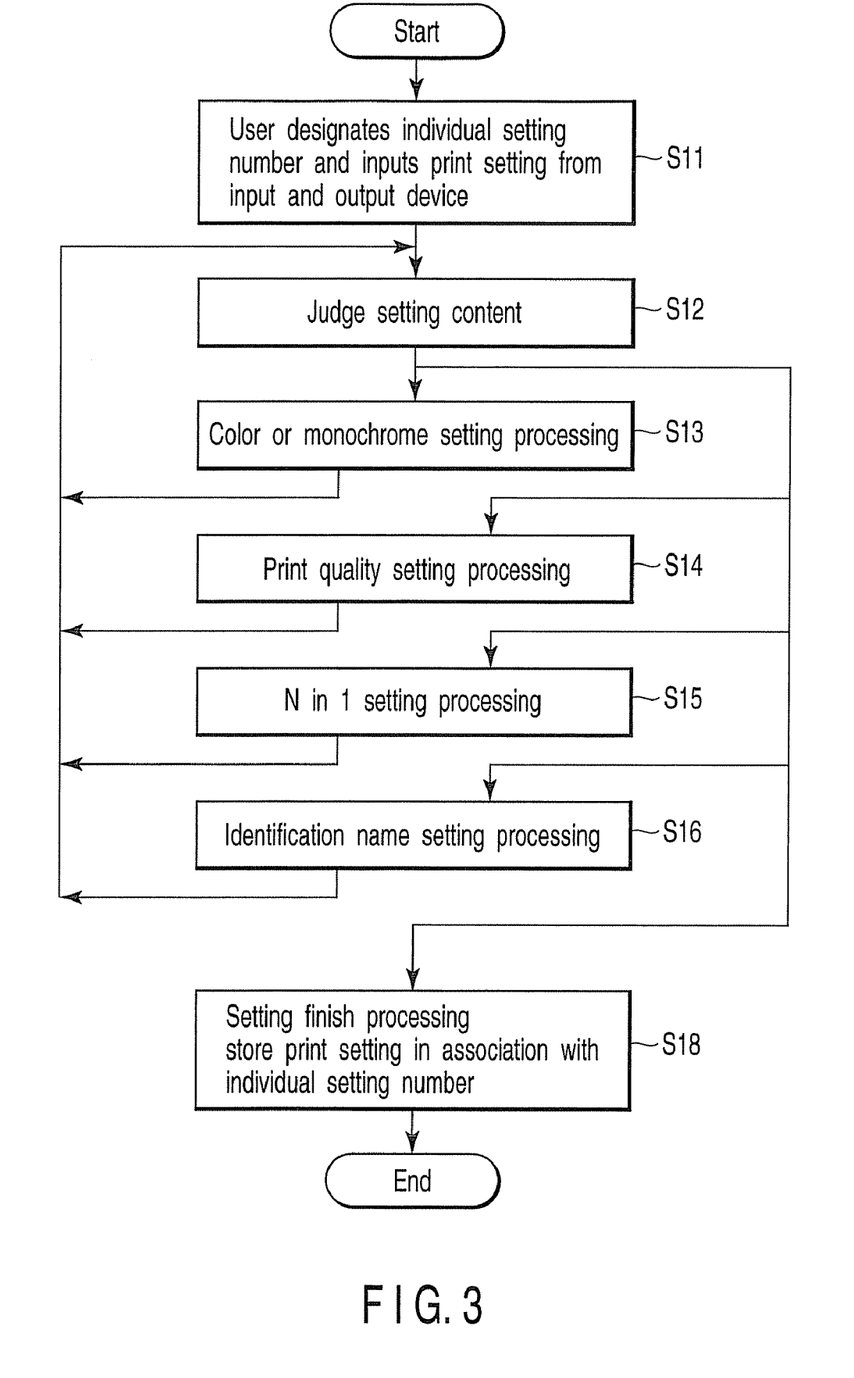
FIG. 3 is a flowchart showing a print setting procedure in which a user of a PC performs print setting in the MFP.

FIG. 3 is a flowchart showing a print setting procedure in which a user of the PC 1 performs print setting in the MFP 2. Data set in this print setting is individually used when the respective PCs 1 use this MFP 2. Therefore, this setting is referred to as individual setting.

In step S11, the user designates an individual setting number and inputs print setting data from the input and output device 11. In step S12, the application software 13 that executes setting processing judges setting content.

When the setting content is designation of "color or monochrome", in step S13, the application software 13 executes color or monochrome setting processing. An original is printed in color or monochrome in accordance with this setting. When the setting content is designation of a "print quality", in step S14, the application software 13 executes print quality setting processing. High definition printing and normal definition printing on the original are controlled according to this setting. When the setting content is designation of "N in 1", in step S15, the application software 13 executes N in 1 setting processing. N pieces of data are printed on one original.

When "setting end" is inputted, in step S18, the application software 13 stores the individual setting number and the print setting data in the individual setting file DB 15 in association with each other. As a result, individual setting data corresponding to the individual setting number is stored in the individual setting file DB 15. Items as objects of the individual setting are not limited to the examples described above. For example, the uniform setting data can be adopted as a setting item and various functions of the MFP 2 can be adopted as setting object items.

In order to cope with a case in which the individual setting is not performed, default setting data set in advance is stored in the individual setting file DB 15.

Figure 4:
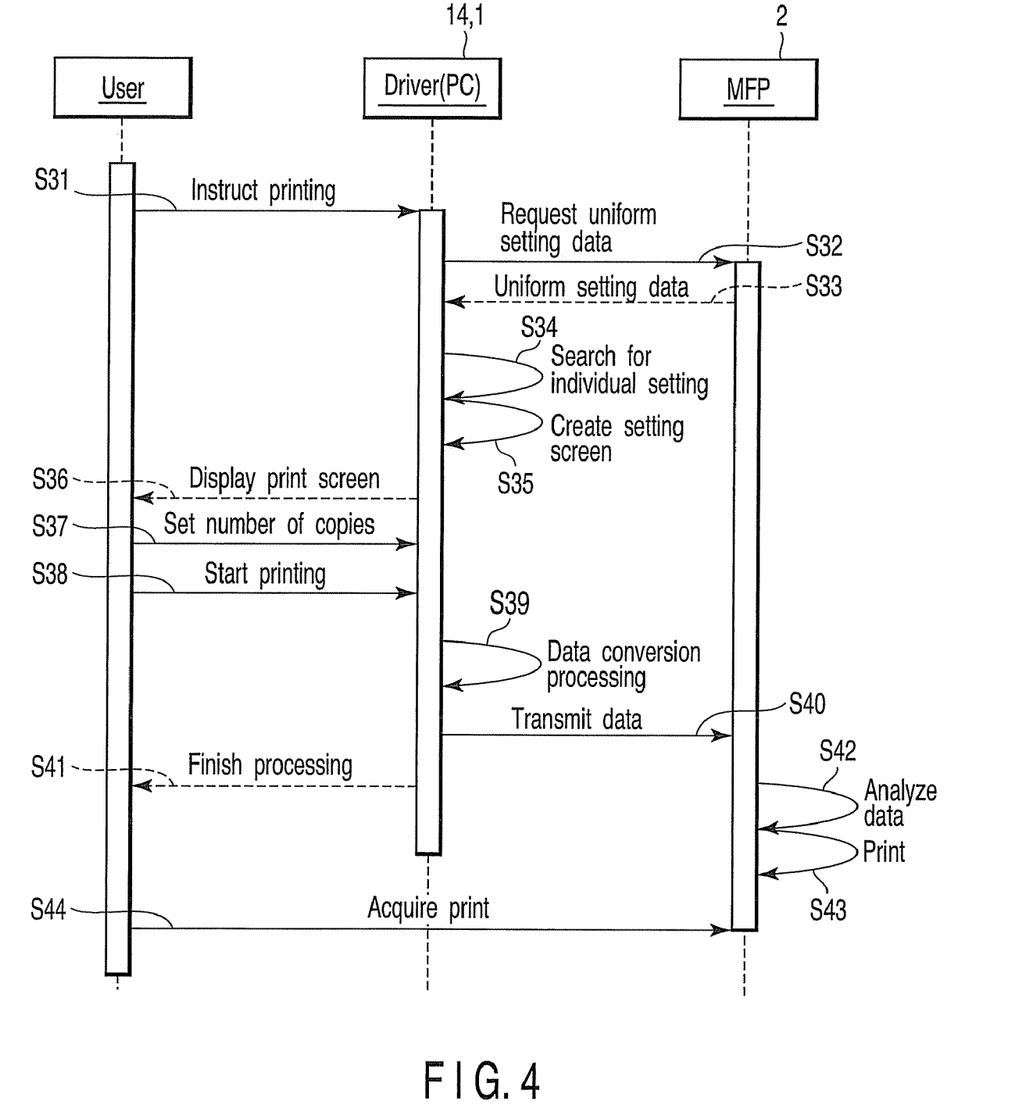
FIG. 4 is a flowchart showing a procedure concerning print processing among the user, the PC, and the MFP.

FIG. 4 is a flowchart showing a procedure concerning print processing among the user, the PC, and the MFP. In the PC 1, the printer driver 14 handles the print processing according to this embodiment.

In step S31, for example, the user designates an image file and instructs printing of the image file from the input and output device 11. In step S32, the printer driver 14 that has received the print instruction transmits a signal for requesting uniform setting data to the MFP 2.

In step S33, the CPU 23 searches through the RAM 24 to check whether the uniform setting data is stored therein. When the uniform setting data is stored, the CPU 23 transmits the uniform setting data to the PC 1.

In step S34, the printer driver 14 stores the transmitted uniform setting data in the uniform setting file DB 16 in the PC and searches through the individual setting file DB 15 to check whether individual setting data is stored. In step S35, the printer driver 14 generates a setting screen. In step S36, the printer driver 14 displays the setting screen on the input and output device 11 as a print screen.

Figure 5:
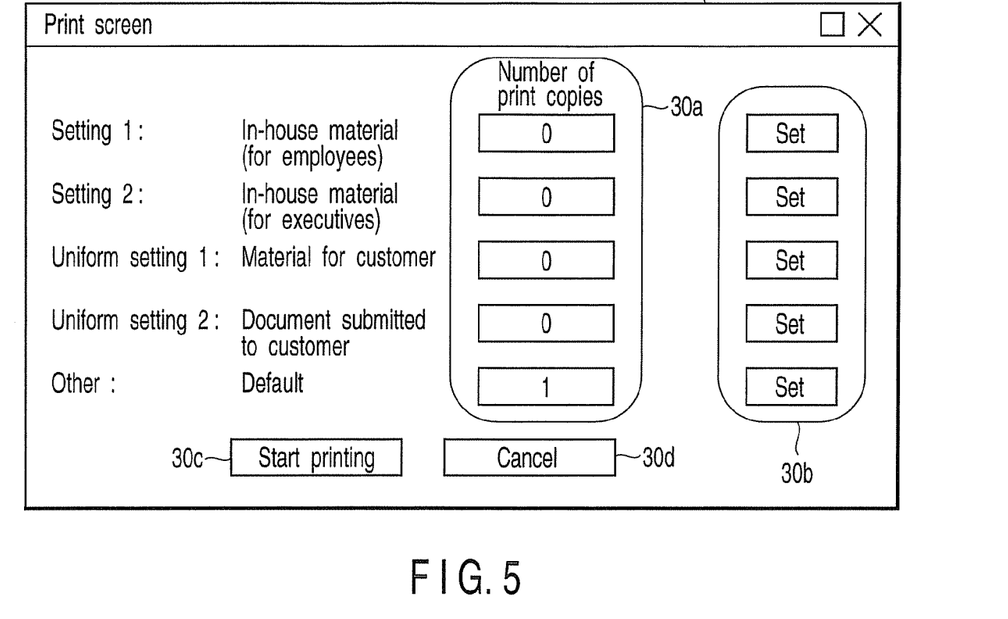
FIG. 5 is a diagram showing a print screen.

FIG. 5 is a diagram showing a print screen 30. In the print screen 30, together with display of a name for each print setting, number-of-print-copies input sections 30*a*, setting-value display buttons 30*b*, a print start button 30*c*, and a cancel button 30*d* are provided. In an example shown in FIG. 5, two individual setting files, two uniform setting files, and one default setting file are displayed.

The number of copies for each print setting is set in each of the number-of-print-copies input sections 30*a*. When 0 is set in this section, printing based on the print setting is not performed. When the user operates one of the setting-value display buttons 30*b*, detailed data of the print setting can be displayed. The user can change this detailed data. When the user operates the print start button 30*c*, a print operation is executed in accordance with content of the print screen 30. When the user operates the cancel button 30*d*, the print processing is finished.

Figure 6:
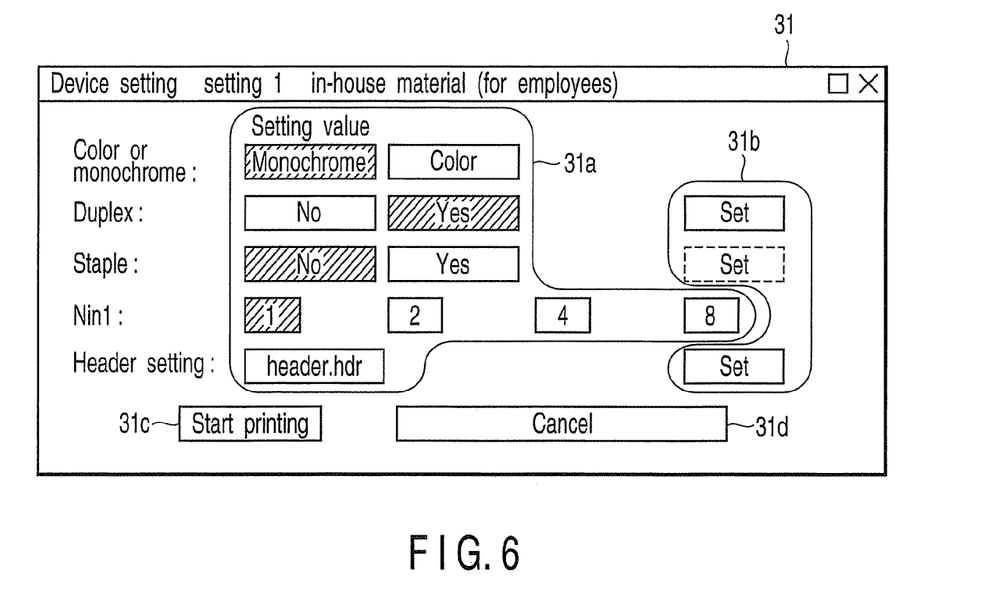
FIG. 6 is a diagram showing a detailed display screen for individual setting.

FIG. 6 is a diagram showing a detailed display screen 31 for individual setting 1. In the detailed display screen 31, setting-value operation buttons 31*a*, setting-value display buttons 31*b*, a print start button 31*c*, and a cancel button 31*d* are provided.

In each of the setting-value operation buttons 31*a*, a value set for each setting item is displayed. Contents displayed in the buttons in a dark color are values presently set. When the user operates the buttons of a light color, the color of the operated button changes to a dark color. This indicates that the setting is changed to a value displayed on the button.

When the user operates one of the setting-value display buttons 31*b*, more detailed content of the print item is displayed. The user can further change the displayed content.

For example, when the user operates the setting-value display button 31*b* corresponding to a print setting item "duplex", plural forms with different directions of printing on both sides of a sheet are displayed. The user can select a desired form out of the forms.

When the user operates the setting-value display button 31*b* corresponding to a print setting item "staple", plural forms with different positions where a staple is provided are displayed. The user can select a desired form out of the forms. In the setting-value operation button 31*a* corresponding to "staple" in FIG. 6, "No" is selected. Therefore, the setting-value display button 31*b* corresponding to "staple" is displayed in a light color. This indicates that the setting-value display button 31*b* cannot be operated.

When the user inputs characters in the setting-value operation button 31*a* corresponding to a print setting item "header setting", the inputted characters can be printed in a header. When the user operates the setting-value display button 31*b* corresponding to the print setting item "header setting", a position of the characters printed in the header can be designated.

When the user operates the print start button 31*c*, a print operation is executed in accordance with displays on the print screen 30 and the detail display screen 31. When the user operates the cancel button 30*d*, the print processing is finished.

In FIG. 6, a print setting in printing an in-house document for employees is shown. Therefore, 2 in 1 in duplex monochrome printing is set to reduce cost as much as possible.

Figure 7:
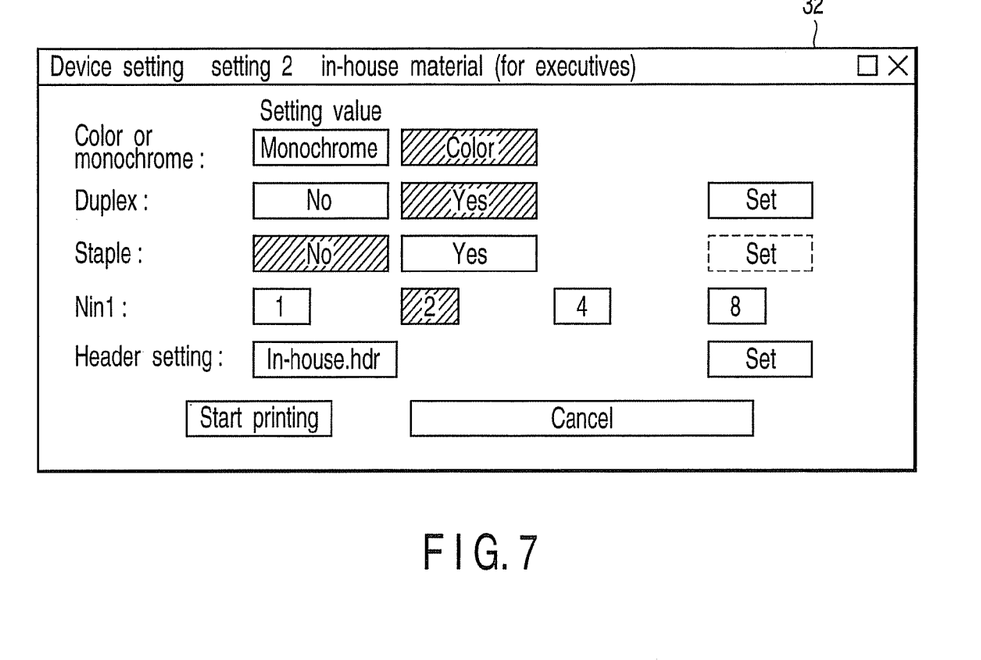
FIG. 7 is a diagram showing the detailed display screen for individual setting.

FIG. 7 is a diagram showing a detailed display screen 32 for individual setting 2. The structure of this detailed display screen 32 is the same as that of the detailed display screen 31 shown in FIG. 5. Thus, detailed explanation of the structure of the detailed display screen 32 is omitted. In FIG. 7, a print setting in printing an in-house document for executives is shown. Therefore, although 2 in 1 in duplex printing is set to reduce cost as much as possible, color printing is set to make the material legible.

Figure 8:
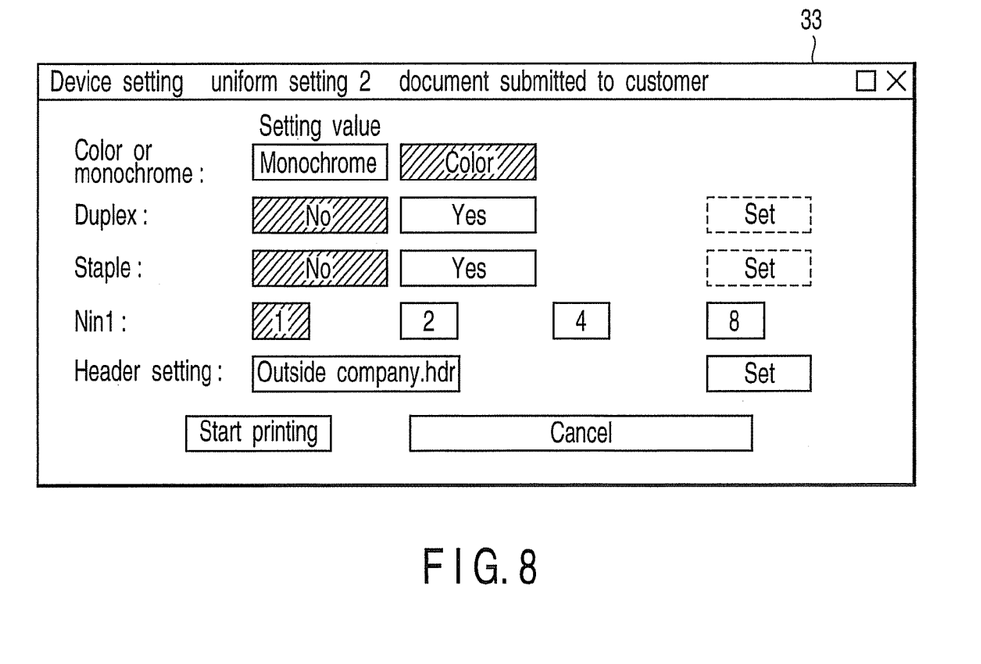
FIG. 8 is a diagram showing a detailed display screen for uniform setting.

FIG. 8 is a diagram showing a detailed display screen 33 for uniform setting 2. The structure of the detailed display screen 33 is the same as that of the detailed display screen 31 shown in FIG. 5. Thus, detailed explanation of the structure of the detailed display screen 33 is omitted. In FIG. 8, a print setting in printing a document submitted to a customer is shown. Therefore, simplex printing and color printing are set to make the entire document legible. Moreover, an indication that the document is a material for a customer is printed on a header.

In a detailed screen concerning uniform setting, print items that can be changed are limited. This is for the purpose of preventing a value set by the administrator of the MFP 2 from being arbitrarily changed on the PC side. Therefore, setting items, a change of which is limited, are only displayed and cannot be changed. For example, processing such as gray-out is applied to the setting items.

Referring back to FIG. 4, in step S37, the user sets the number of copies of a document, which the user desires to print from the print screen 30, in one of the number-of-pint-copies input sections 30*a*. In step S38, the user depresses the print start button 30*c*. Then, in step S39, the printer driver 14 converts a print processing command from the application software 13 into print data on the basis of setting content on the print screen 30.

In this conversion, uniform setting data and individual setting data corresponding to a selected print setting are referred to. Even when the user changes and uses the uniform setting data, the changed uniform setting data is effective only in the print processing. Therefore, when other image files are printed or when the other PCs perform printing, the change of the data does not affect the printing.

In step S40, the printer driver 14 transmits the generated print data to the MFP 2. In step S41, the printer driver 14 displays an indication that the print processing is finished on the input and output device 11.

In step S42, the MFP 2 performs preparation for controlling a print operation on the basis of the transmitted print data. In step S43, the MFP 2 executes printing. In step S44, the user can acquire a print generated in this way.

[First Variation]

Print processing at the time when uniform setting and individual setting are not performed is explained.

Figure 9:
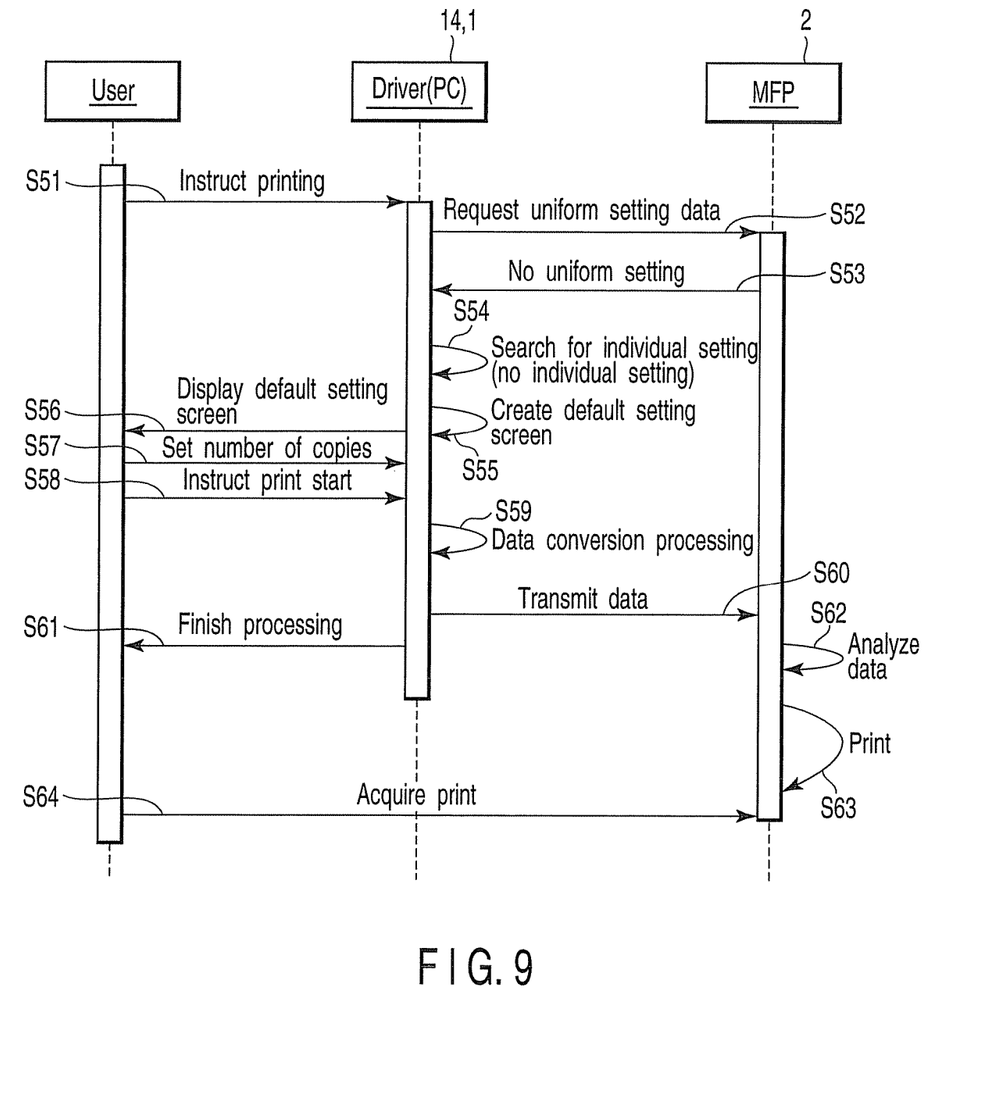
FIG. 9 is a flowchart showing a procedure concerning print processing among the user, PC, and the MFP.

FIG. 9 is a flowchart showing a procedure concerning print processing among the user, the PC, and the MFP. In the PC 1, the printer driver 14 handles the print processing according to this embodiment.

In step S51, the user designates an image file and instructs printing of the image file from the input and output device 11. In step S52, the printer driver 14 that has received the print instruction transmits a signal for requesting uniform setting data to the MFP 2.

In step S53, the CPU 23 searches through the RAM 24 to check whether the uniform setting data is stored therein. When the uniform setting data is not stored, in step S53, the CPU 23 transmits an indication that the uniform setting data is not present to the PC 1.

In step S54, the printer driver 14 searches through the individual setting file DB 15 to check whether individual setting data is stored therein. When only default setting data is stored, in step S55, the printer driver 14 generates a default setting screen. In step S56, the printer driver 14 displays the default setting screen on the input and output device 11. This default setting screen is displayed instead of the print screen shown in FIG. 5.

Figure 10:
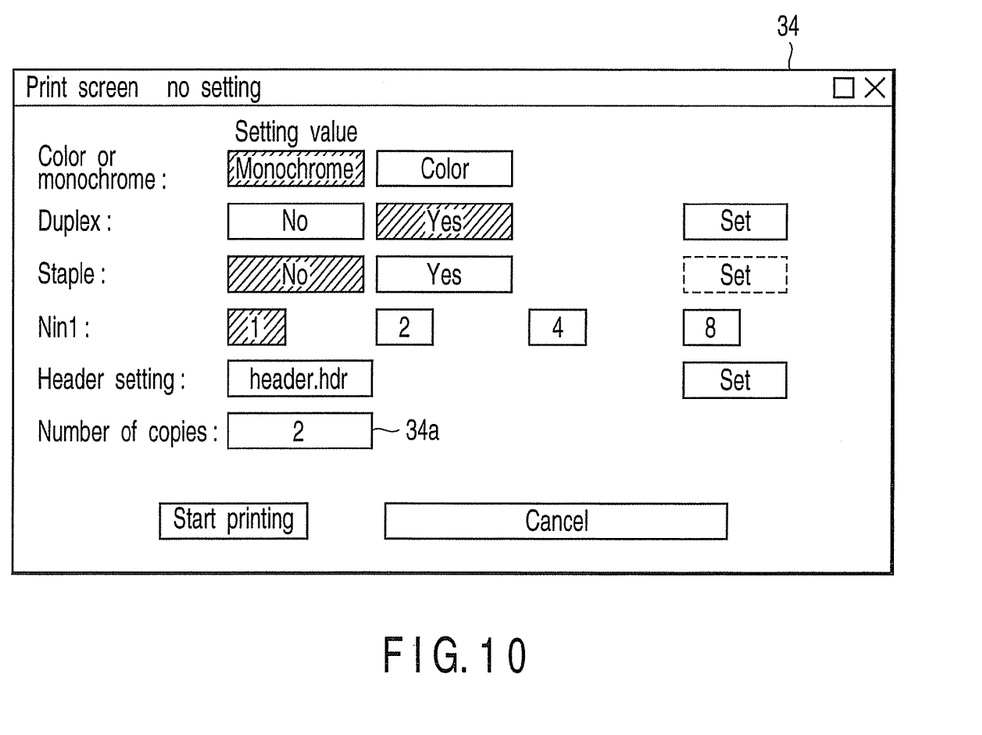
FIG. 10 is a diagram showing a default setting screen.

FIG. 10 is a diagram showing a default setting screen 34. The default setting screen 34 has the structure same as that of the detailed display screen 31 shown in FIG. 6 except that a number-of-print-copies input section 34a for setting the number of print copies is provided. Therefore, detailed explanation of the default setting screen 34 is omitted.

A procedure in steps S57 to S64 for executing printing on the basis of the default setting screen 34 is the same as the procedure in steps S37 to S44 shown in FIG. 4. Thus, detailed explanation of the procedure is omitted.

[Second Variation]

In the embodiments described above, uniform setting can be performed only on the MFP 2 side. However, in a form of a second variation, uniform setting can be performed in the PC 1.

Figure 11:
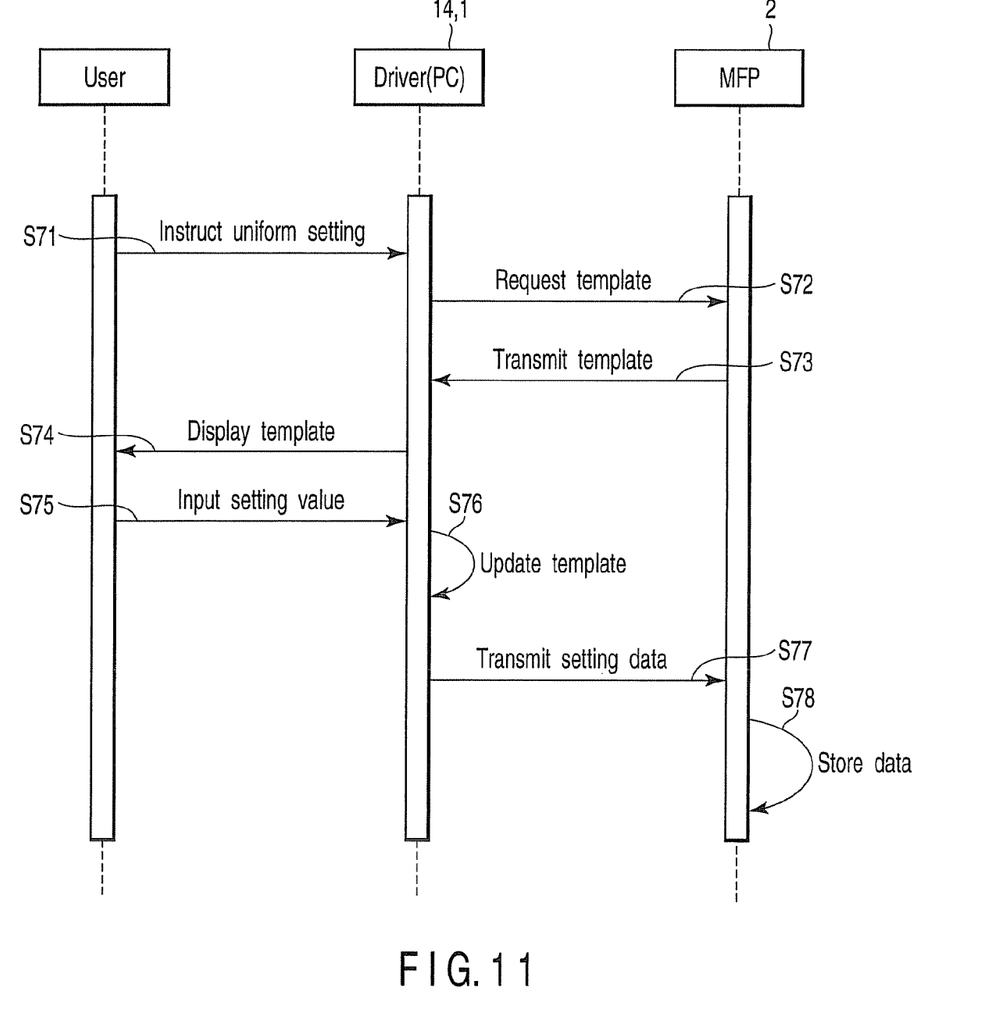
FIG. 11 is a flowchart showing a procedure concerning print processing among the user, the PC, and the MFP.

FIG. 11 is a flowchart showing a procedure concerning print processing among the user, the PC, and the MFP. In the PC 1, the printer driver 14 handles print processing according to this embodiment.

In step S71, the user inputs an instruction for executing uniform setting from the input and output device 11. In step S72, the printer driver 14 that has received the uniform setting instruction transmits a signal for requesting a template for the uniform setting to the MFP 2.

In step S73, the CPU 23 transmits the template for uniform setting to the PC 1. Setting items that the PC 1 may be allowed to set are described in the template to be transmitted. In other words, items that are judged as inappropriate to allow the user to set are not described in the template to be transmitted. Alternatively, it is also possible that items are described in the template but cannot be operated.

In step S74, the printer driver 14 generates a setting screen on the basis of the transmitted template and displays the setting screen on the input and output device 11. The user inputs a setting value from the input and output device 11 using this setting screen. When the user decides the setting input, in step S76, the printer driver 14 updates the template on the basis of the inputted set value. In step S77, the printer driver 14 transmits setting data to the MFP 2.

The MFP 2 creates a uniform setting file on the basis of the setting data transmitted by the CPU 23 and stores the uniform setting file in the RAM 24.

[Third Variation]

In the embodiments described above, the operations of the print processing system including the plural PCs and the one MFP are explained. In a form of a third variation, a print processing system includes plural PCs and plural MFPs.

With such a structure, in signal transmission and reception operations between the PCs and MFPs, a cooperative operation of the MFPs can be realized in addition to the operations described above. In other words, efficient print processing can be performed by allocating, with one of the plural MFPs set as a core machine, jobs to the other MFPs.

For example, it is also possible to transfer print data to specific MFPs to cause the MFPs to handle color printing and duplex printing, respectively. It is also possible to transfer, when one MFP has broken down, print data to the other MFPs such that the other MFPs can succeed and execute jobs.

According to the embodiments explained above, the effects described below can be realized.

1. The "individual setting" function is provided and the mechanism that can store and use a setting is introduced. Consequently, the user can prepare plural settings in advance.
2. The "uniform setting" function is provided and the mechanism that can perform the uniform setting from the MFP and store the setting in the MFP is introduced. Consequently, common printing can be performed among people who use the MFP. The user can use the uniform setting without performing special setting.
3. The "uniform setting" function can be set from the outside of the MFP.
4. The "individual setting" function and the "uniform setting" function can be used with a part of the functions changed. Therefore, a setting value can be flexibly used.
5. The "individual setting" function and the "uniform setting" function can be selected with simple operation. Therefore, simultaneous printing employing plural settings can be realized with simple operation.

The functions explained in the embodiments can be realized not only by using hardware but also by causing, using software, a computer to read a program that describes the functions. One of the software and the hardware may be appropriately selected to realize the functions.

Moreover, it is possible to realize the functions by causing the computer to read a program stored in a not-shown storage medium. The storage medium according to the embodiments may take any storage form as long as the storage medium can store the program and is a computer readable storage medium.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A non-transitory computer readable medium having recorded therein a print processing program for an information processing apparatus that exchanges information with a printing apparatus through a communication line and causes the printing apparatus to execute printing, the print processing program causing the information processing apparatus to execute:
- a first print-setting generating and storing step of generating and storing at least one first print setting via an input device connected to the information processing apparatus;
- a second print-setting acquiring step of acquiring at least one second print setting from the printing apparatus through the communication line;
- a third print-setting selecting step of urging a user to select at least one third print setting out of the stored first print setting and the acquired second print setting;
- a print-data converting step of converting a print command group issued by application software into respective print data in accordance with the selected respective third print settings; and
- a print-data transmitting step of transmitting the respective print data to the printing apparatus and causing the printing apparatus to print the print data.

2. The non-transitory computer readable medium according to claim 1, wherein the second print setting is generated by the printing apparatus and stored in the printing apparatus.

3. The non-transitory computer readable medium according to claim 2, wherein the at least one second print setting is generated by the information processing apparatus and stored in the printing apparatus.

4. The non-transitory computer readable medium according to claim 1, wherein the third print-setting selecting step includes:
- a setting-screen displaying step of displaying the first and second print settings together with a number of print copies; and
- a number-of-copies setting step of selecting, as the third print setting, the first and second print settings in which an integer equal to or larger than 1 is set in the number of print copies.

5. The non-transitory computer readable medium according to claim 4, wherein, in the print-data transmitting step, the number of print copies set together with the print data is transmitted to the printing apparatus.

6. The non-transitory computer readable medium according to claim 1, wherein the first and second print settings are changed from the input device.

7. The non-transitory computer readable medium according to claim 1, wherein the second print setting includes an item that cannot be changed from the input device.

8. The non-transitory computer readable medium according to claim 1, further comprising a default-setting selecting step of urging, when the first and second print settings are not performed, the user to select a default print setting, which is decided in advance, as the third print setting.

9. A print processing system comprising:
- a printing apparatus; and
- an information processing apparatus that exchanges information with the printing apparatus and causes the printing apparatus to execute printing,
- the printing apparatus and the information processing apparatus being connected to each other through a communication line, wherein the information processing apparatus includes:
- a first print-setting generating and storing unit that generates and stores at least one first print setting via an input device connected to the information processing apparatus;
- a second print-setting acquiring unit that acquires at least one second print setting from the printing apparatus through the communication line;
- a third print-setting selecting unit that urges a user to select at least one third print setting out of the stored first print setting and the acquired second print setting;
- a print-data converting unit that converts a print command group issued by application software into respective print data in accordance with the selected respective third print settings; and
- a print-data transmitting unit that transmits the respective print data to the printing apparatus and causes the printing apparatus to print the print data, and the printing apparatus includes:
- a print-setting generating and storing unit that generates and stores at least one print setting;
- a print-setting transmitting unit that transmits the stored print setting to the information processing apparatus through the communication line according to a request from the information processing apparatus; and
- a printing unit that executes printing on the basis of the print data transmitted from the information processing apparatus through the communication line.

10. The print processing system according to claim 9, wherein the printing apparatus further includes a print-setting acquiring and storing unit that acquires at least one print setting generated by the information processing apparatus via the communication line and stores the print setting.

11. A print processing system according to claim 9, wherein
- another printing apparatus is further connected to the communication line, and
- the printing apparatus further includes a print-data transferring unit that transfers specific print data in the print data, which is transmitted from the information processing apparatus, to the another printing apparatus.

12. The print processing system according to claim 9, wherein the first print setting and the second print setting are changed from the input device.

13. The print processing system according to claim 9, wherein the information processing apparatus further comprises a default-setting selecting unit which urges a user to select a default print setting, which is described in advance, as the third print setting when the first and the second print settings are not performed.

14. A print processing method which is executed by an information processing apparatus connected to a printing apparatus through a communication line, the method comprising:
- generating at least one first print setting;
- storing the first print setting which has been generated in a memory of the information processing apparatus;
- acquiring at least one second print setting from the printing apparatus through the communication line;
- displaying the first and second print settings so that at least one print setting is selected from the first print setting which is stored in the memory and the second print setting which has been acquired;

converting a print command group which is generated by application software into respective print data, in accordance with the at least one print setting selected from the first print setting and the acquired second print setting; and transmitting the respective print data to the printing apparatus for performing printing by the printing apparatus.

15. The print processing method according to claim 14, wherein the number of print copies is accepted for each of the print settings in a state where the first print setting and the second print setting are displayed.

16. The print processing method according to claim 15, wherein changes of the print settings of the first print setting stored in the memory and the second print setting which has been acquired are accepted.

17. The print processing method according to claim 16, wherein a change of the second print setting is more restricted than a change of the first print setting.

18. The print processing method according to claim 17, wherein a user is urged to select a default print setting, which is decided in advance, when the first and second print settings are not performed.

* * * * *